UNITED STATES PATENT OFFICE.

NICHOLAS F. AVERY, OF BROCKTON, MASSACHUSETTS, ASSIGNOR OF ONE-HALF TO CHARLES THOMAS, OF BROCKTON, MASSACHUSETTS.

COMPOSITION OF MATTER.

1,015,468.  Specification of Letters Patent.  Patented Jan. 23, 1912.

No Drawing.  Application filed November 11, 1910. Serial No. 591,913.

*To all whom it may concern:*

Be it known that I, NICHOLAS F. AVERY, a citizen of the United States, residing at Brockton, in the county of Plymouth and State of Massachusetts, have invented certain new and useful Improvements in Composition of Matter, of which the following is a specification.

The object of the present invention is an improved composition matter which is particularly adapted for use in the manufacture of boots and shoes, and which may be employed in place of leather for making heels, soles and various other parts.

Another object of the invention is a composition which is partially composed of reclaimed rubber and leather buffings or scraps, thereby utilizing the materials which have heretofore been wasted and effecting a material economy in the cost of production of the foot-wear.

A further object of the invention is a composition of this character in which the rubber and buffings are effectually united with other ingredients so as to provide a particularly efficient compound from which the parts may be conveniently manufactured in any size and shape desired.

My composition consists of the following ingredients, combined in approximately the proportions stated, viz:—

| | |
|---|---|
| Reclaimed rubber, | 34 pounds. |
| Whiting, | 15 pounds. |
| Litharge, | 6 pounds. |
| Tar or pitch, | 8 pounds. |
| Sulfur, | ½ pound. |
| Leather buffings or scraps, | 17 pounds. |

The leather buffings should be in a comminuted state and for this purpose are preferably passed through a sieve or bolter having 44 meshes to the square inch.

The reclaimed rubber, whiting, litharge, tar or pitch, and sulfur are placed in a mixing and grinding machine and are thoroughly worked between two heavy steel rolls which rotate in opposite directions. The leather buffings are added gradually so as to be evenly distributed throughout the mass and to be effectually incorporated therein. The rolls are preferably heated by means of steam pipes running therethrough, to a temperature of approximately 200 degrees so as to heat the ingredients during the mixing operation. The reclaimed rubber is hard and dry, and the whole mixture would be of the same nature were it not for the presence of the tar or pitch which is softened by the heat of the rolls and binds the ingredients together to form a plastic mass. When the entire mass has been thoroughly mixed, it is made out into sheets of suitable thickness, and soles and heel lifts are cut out of the sheets in any approved manner, as for instance, by dies. The articles are then placed in suitable molds consisting of two or more plates or patterns which are forced together under hydraulic pressure of about 20 tons. The plates are heated by steam at a pressure of 40 to 60 pounds to the square inch, in order to vulcanize the article contained in the mold. The article is removed from the mold after about 10 minutes and is a very compact, solid mass.

The functions of the various ingredients are as follows: The reclaimed rubber renders the compound somewhat resilient; the leather buffings give the article body; the sulfur acts as the vulcanizing agent; the whiting is used as a filler to increase the bulk of the composition; the tar or pitch softens the ingredients, binds the compound together and fills the pores of the leather buffings and the interstices of the composition to render the product water-proof; while the litharge serves primarily to harden the compound and also assists the sulfur in the vulcanization. The particular proportions of these ingredients are quite important in order to produce a compound having, what may be termed, a leathery consistency. If too much tar or pitch were used the compound would not be durable, and on the other hand the presence of too much litharge would render the compound too hard for the use for which it is intended. It will therefore be apparent that heels and soles formed from my improved compound will possess sufficient resiliency to cushion the tread of the shoe, and yet will be quite durable and less liable to become chipped than the parts are when made of leather. It is also to be noted that the articles are water-proof. Another important advantage arises from the fact that the leather buffings absorb the black ball and ink used in finishing shoes, thereby enabling the surfaces of the composition parts to take a high polish. The composition heels heretofore made, particularly the rubber heels, will not absorb this polish, and hence any finish applied to the surface of such heels, soon rubs off, thus detracting from the appearance of the shoe. However, with applicant's invention the polish is permanent and may be readily applied in the usual manner and without any change in machines now employed for finishing the shoes. By molding the parts from the composition in the exact size and shape desired, the necessity of trimming and shaping the parts by a separate process, is avoided, and the production of the footwear is considerably facilitated and the cost decreased.

The composition is primarily intended for making heels, but it is to be understood that it is not limited to this use but may be employed in the manufacture of shanks, box-toes, counters, and other similar parts of the shoes. To form the last-mentioned parts, which do not require the same solidity as the heels and soles, the composition of matter may be sheeted through calenders employed for this purpose. Furthermore, it will be noted that the parts necessary for repair work may be made from the composition, as well as parts for new shoes.

Having thus described the invention, what I claim as new is:—

1. The herein-described composition of matter for manufacturing parts of footwear, consisting of reclaimed rubber, 34 pounds, whiting, 15 pounds, litharge 6 pounds, tar 8 pounds, sulfur $\frac{1}{2}$ pound, and leather buffings 17 pounds.

2. The herein-described composition of matter, consisting of reclaimed rubber, litharge, tarry material, sulfur, and leather buffings.

In testimony whereof, I affix my signature in presence of two witnesses.

NICHOLAS F. AVERY. [L. S.]

Witnesses:
 MARSHALL WILBUR,
 CHARLES THOMAS.